United States Patent
Jang et al.

(10) Patent No.: US 11,093,174 B1
(45) Date of Patent: Aug. 17, 2021

(54) INFORMATION HANDLING SYSTEM HAVING IMPROVED HOST MEMORY BUFFER FOR INPUT/OUTPUT REQUESTS

(71) Applicant: DELL PRODUCTS, LP, Round Rock, TX (US)

(72) Inventors: Young Hwan Jang, Gwangju-si (KR); Lip Vui Kan, Hillbrooks (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/794,404

(22) Filed: Feb. 19, 2020

(51) Int. Cl.
*G06F 3/06* (2006.01)
*G06F 12/0866* (2016.01)

(52) U.S. Cl.
CPC .......... *G06F 3/0659* (2013.01); *G06F 3/068* (2013.01); *G06F 3/0611* (2013.01); *G06F 12/0866* (2013.01); *G06F 2212/1024* (2013.01)

(58) Field of Classification Search
None
See application file for complete search history.

(56) References Cited

U.S. PATENT DOCUMENTS

| | | |
|---|---|---|
| 2017/0371794 A1 | 12/2017 | Kan |
| 2018/0101477 A1 | 4/2018 | Kan et al. |
| 2018/0349287 A1 | 12/2018 | Kan |
| 2019/0121545 A1* | 4/2019 | La Fratta ............ G06F 13/1642 |
| 2019/0227745 A1* | 7/2019 | Hong ...................... G06F 3/061 |
| 2020/0065027 A1* | 2/2020 | La Fratta ................ G06F 3/061 |

* cited by examiner

*Primary Examiner* — Michael Alsip
(74) *Attorney, Agent, or Firm* — Larson Newman, LLP (57) ABSTRACT

A host memory buffer is configured as a write cache for prioritizing read operations. When a peripheral device (such as a solid-state drive) receives a mixture of read requests and write requests, the write requests may be suspended or deferred to first execute the read requests. The write requests may be cached to the host memory buffer, thus allowing the peripheral device to process the read requests for relatively immediate response. Once the read requests are completed, the peripheral device may begin executing a queue of the write requests stored to the host memory buffer. This caching strategy results in a thirty percent (30%) improvement in drive performance.

17 Claims, 10 Drawing Sheets

FIG. 10

INFORMATION HANDLING SYSTEM HAVING IMPROVED HOST MEMORY BUFFER FOR INPUT/OUTPUT REQUESTS

FIELD OF THE DISCLOSURE

This disclosure generally relates to information handling systems, and more particularly relates to redirecting write operations to host memory buffers and/or to prioritizing read operations in read/write mixed input/output requests.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A host memory buffer is configured as a write cache for prioritizing read operations. When a peripheral device (such as a solid-state drive) receives a mixture of read requests and write requests, the write requests may be suspended or deferred to first execute the read requests. The write requests may thus be cached to the host memory buffer, thus allowing the peripheral device to process the read requests for relatively immediate response. Once the read requests are completed, the peripheral device may begin executing a queue of the write requests stored to the host memory buffer. This caching strategy results in a thirty percent (30%) improvement in drive performance.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
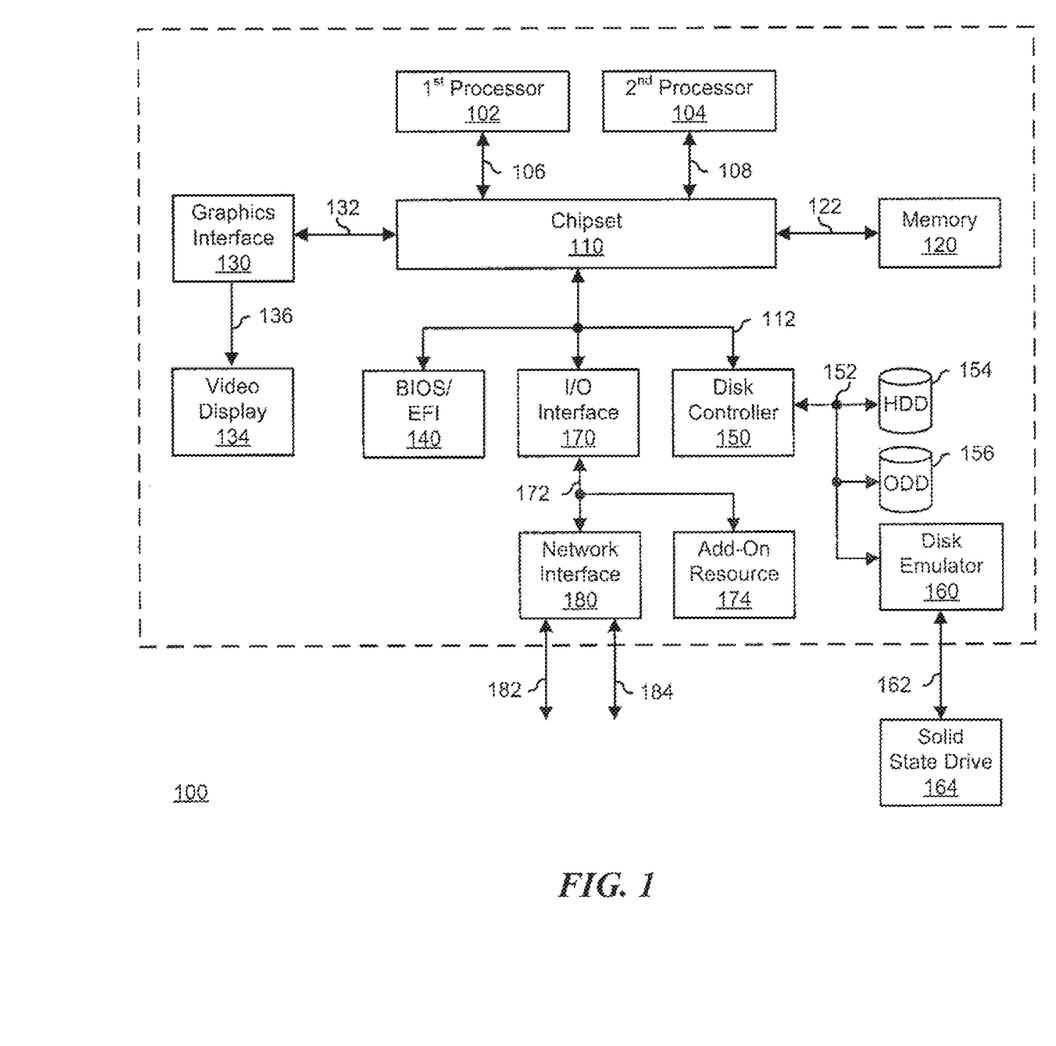
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface device 180, and a baseboard management controller (BMC) 190. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processors 102 and 104, which provides various management functions for information handling system 100. In an embodiment, BMC 190 may be responsible for granting access to a remote management system that may establish control of the elements to implement power management, cooling management, storage management, and the like. The BMC 190 may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface 192 that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RA-CADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated into another element of the information handling system such as chipset 110, or another suitable element, as needed or desired. As such, BMC 190 can be part of an integrated circuit or a chip set within information handling system 100. BMC 190 may operate on a separate power plane from other resources in information handling system 100. Thus BMC 190 can communicate with the remote management system via network interface 194 or the BMC can communicate with the external mobile device using its own transceiver circuitry while the resources or elements of information handling system 100 are powered off or at least in low power mode. Here, information can be sent from the remote management system or external mobile device to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Figure 2:
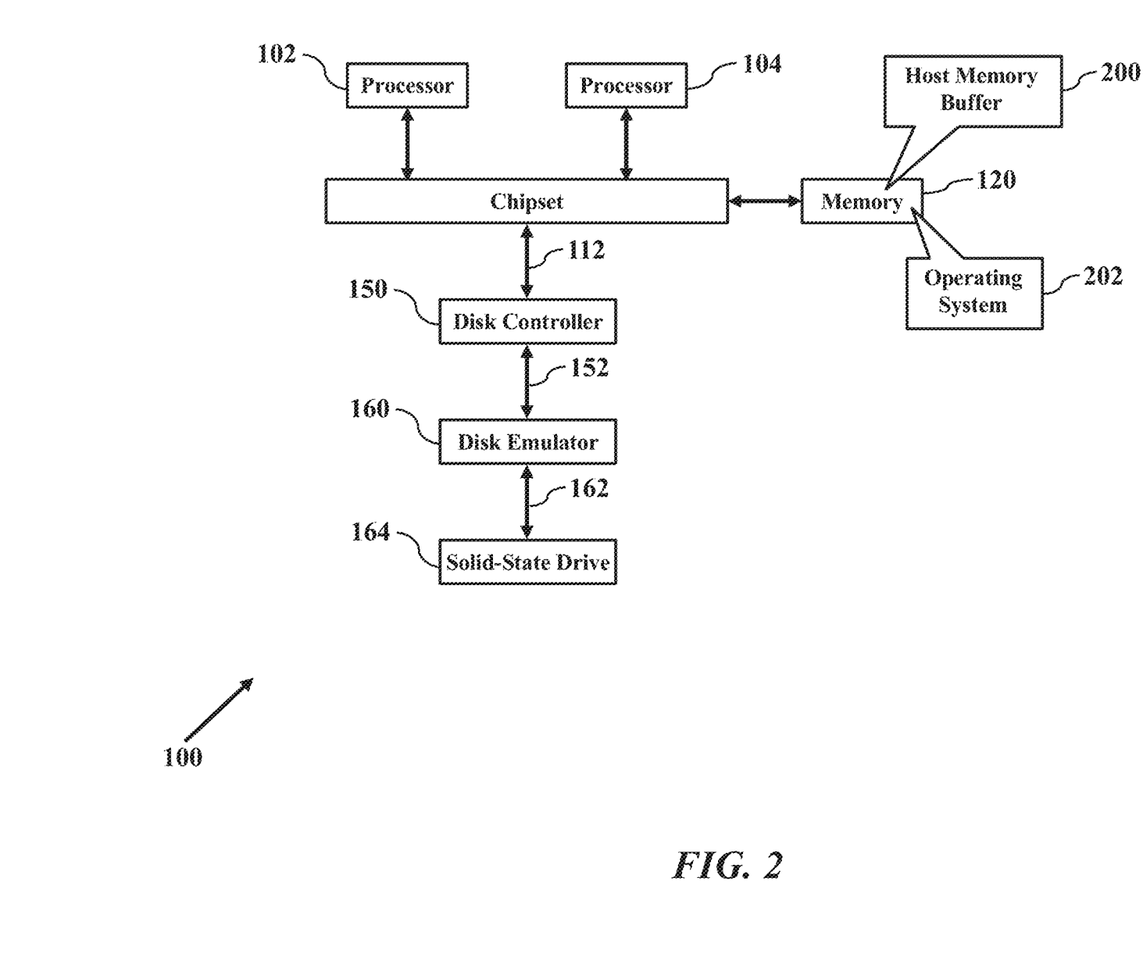
FIGS. 2-3 illustrate a host memory buffer, according to exemplary embodiments.
Figure 3:
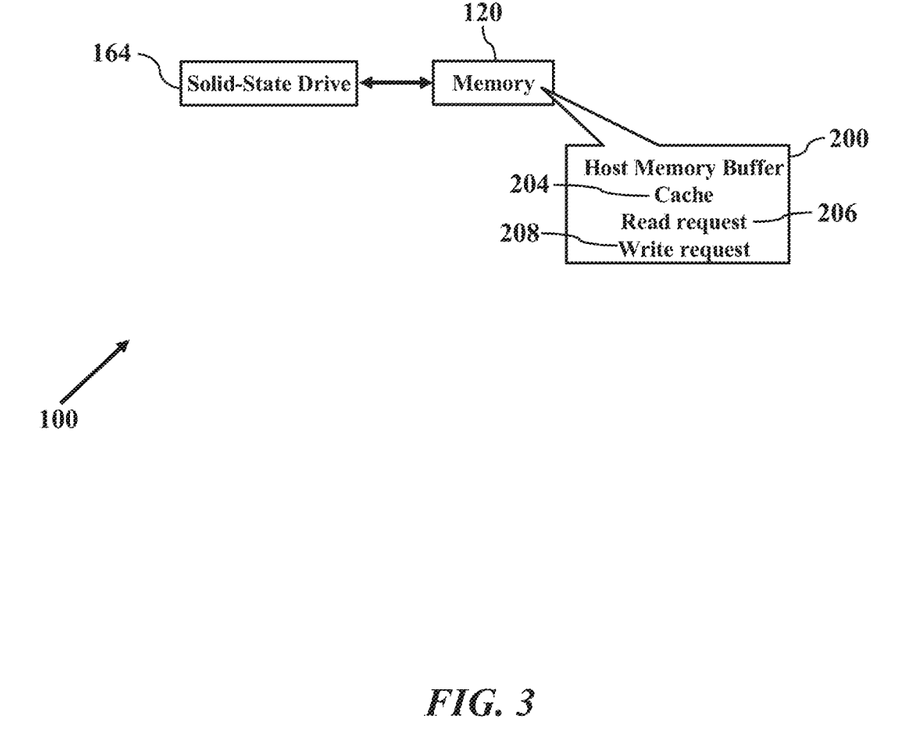

FIGS. 2-3 illustrate a host memory buffer 200, according to exemplary embodiments. The host memory buffer 200 may be any portion of the memory 120 that is configured for, and/or dedicated to, the solid-state drive (SSD) 164. When the processors 102/104 access and/or execute an operating system 202 (perhaps stored by the memory 120), the operating system 202 may allocate and/or partition the host memory buffer 200 to the solid-state drive 164. The solid-state drive 164 may have exclusive use of the host memory buffer 200, or the host memory buffer 200 may be a shared resource with other components, peripherals, or software/services. Even though the solid-state drive 164 may have its own internal processor and memory device (not shown for simplicity), the host memory buffer 200 may increase speed and efficiency for some input/output tasks. The host memory buffer 200 takes advantage of the I/O channel 112 (such as the direct memory access capabilities of PCI Express) to allow the solid-state drive 164 to access and use any of the memory 120 (such as DRAM).

FIG. 3 illustrates the host memory buffer 200 as a cache memory 204. Conventional schemes utilize the host memory buffer 200 to cache mapping information (such as a mapping table of logical block addresses to physical NAND addresses). This disclosure, though, uses the host memory buffer 200 as write cache for read prioritization. Because the size of the host memory buffer 200 is substantially greater (i.e., 60 times larger) than the conventional cache internal to the solid-state drive 164, the host memory buffer 200 may efficiently be used to prioritize read requests or operations 206 over write requests or operations 208 in a typical client busty workload patterns. When the host (such as the information handling system 100) issues read and write requests 206 and 208 in a mixed sequence, the solid-state drive 164 may re-schedule any write operation 208 from its internal cache to the host memory buffer 200. The solid-state drive 164 may thus prioritize the read operation 206 without first completing and/or executing the write operation 208. This caching strategy extracts maximum potential read write performance in typical mixed workload conditions.

Figure 4:
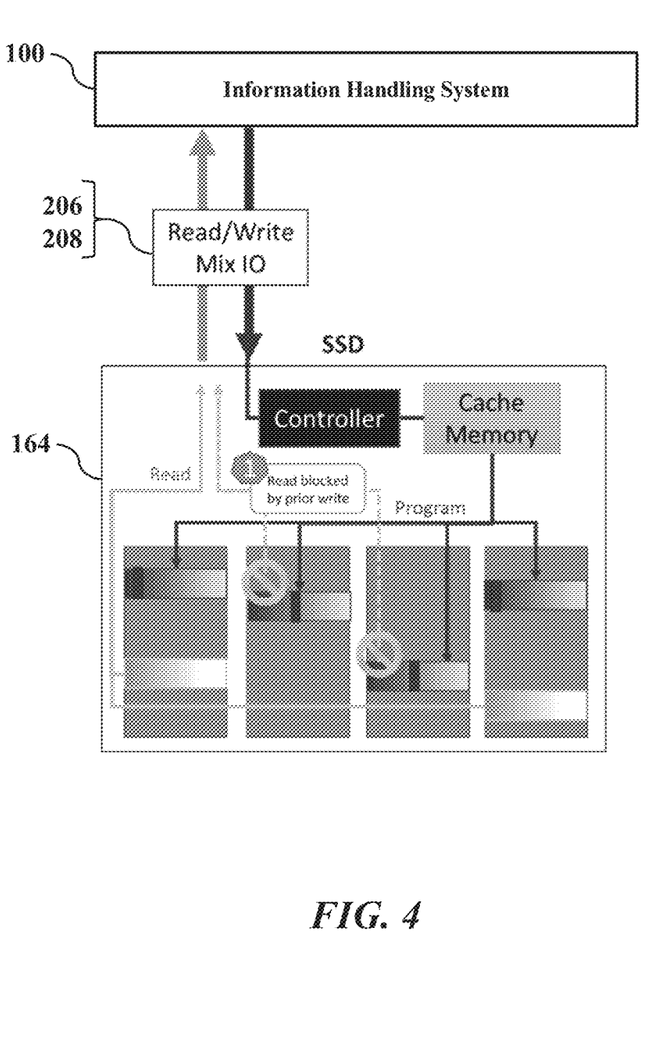
FIGS. 4-7 illustrate a caching method, according to exemplary embodiments.
Figure 5:
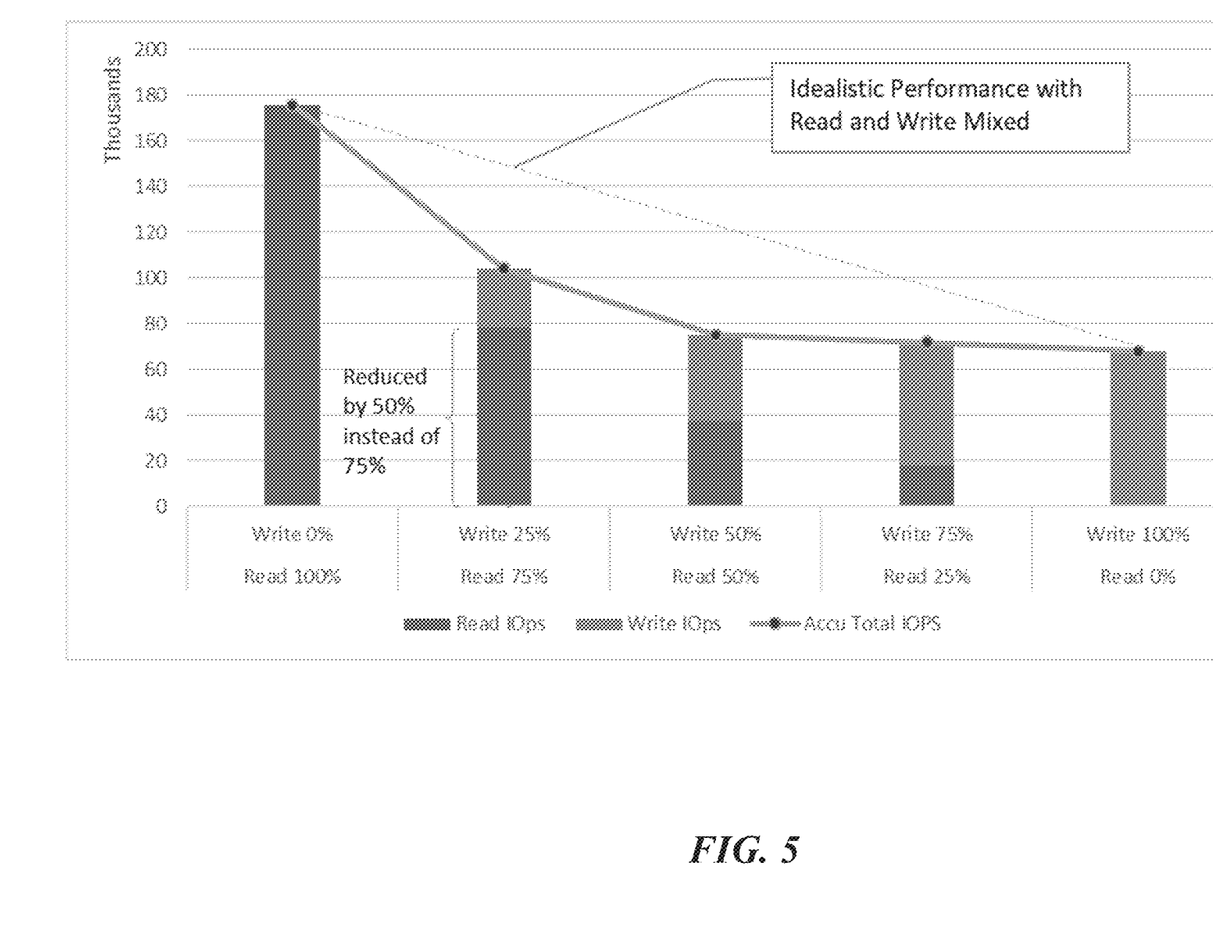

FIGS. 4-7 illustrate the caching strategy, according to exemplary embodiments. FIGS. 4-5 illustrate read/write bottlenecks. When the information handling system 100 issues or sends a mixed sequence of the read operations 206 and the write operations 208, a new or recent read request or operation 206 is blocked, or delayed, by a prior or historical write request or operation 208 that is currently being executed. The read request 206, in other words, may be substantially delayed until the write request 208 is completed. The mixed sequence (of the read operations 206 and the write operations 208) thus causes a software program to be delayed. Data writes, in other words, may require longer times than data reads. When the software program is in process at the component media (such as the solid-state drive 164), any read operation 206 has to be waited until NAND media completes the write operation 208. FIG. 5 illustrates this read/write performance limitation by charting NVMe SSD performance in different ratios of read and write I/O, swinging from 100% read to 100% write in mixed manner (tested with Hynix PC400 512 GB, 4 KB random read/write mixed at Queue Depth 4, at 8 GB range). When the read and write mixed ratio is 75% and 25%, the combined performance is about thirty percent (30%) less than ideally perform based on its raw read (100%) and write numbers. Real life workloads are always mixture of random read/write operations. So, the real-life benchmark numbers such as PCMark are often less than those synthetic benchmark numbers for today's SSDs.

Figure 6:
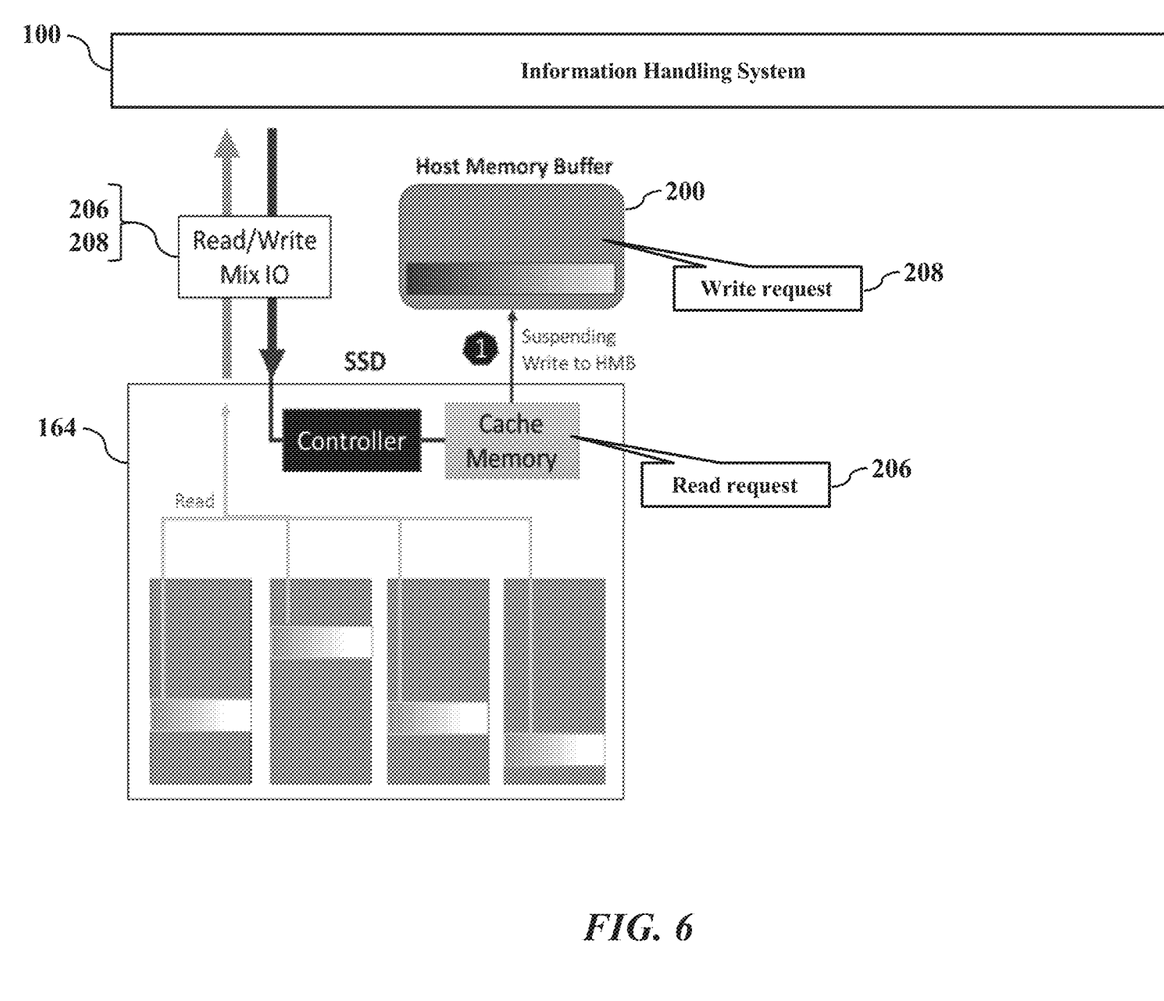
Figure 7:
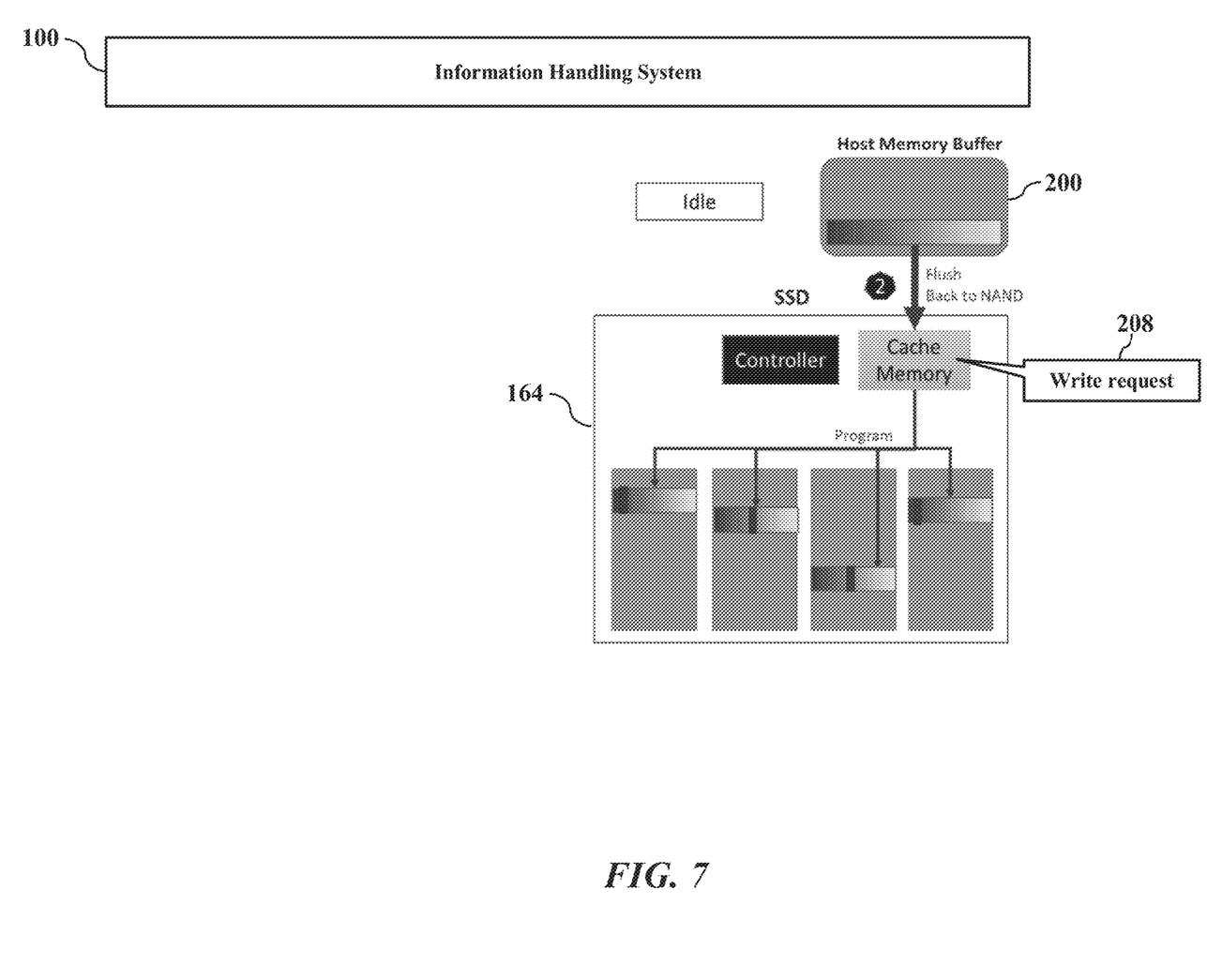

FIGS. 6-7, though, illustrate prioritization. When the solid-state drive 164 receives any write request 208, FIG. 6 illustrates the solid-state drive 164 suspending execution of the write request 208. The solid-state drive 164, instead, may send and/or cache the write request 208 to the host memory buffer 200. Because the controller of the solid-state drive 164 need not immediately execute the write request 208, the solid-state drive 164 may ignore or defer the write request 208 and, instead, prioritize the read request 206 over the write request 208. The solid-state drive 164 may thus consult any mapping table or information, retrieve the corresponding data blocks to the read, and return send the data blocks to the host information handling system 100 in response to the read request 206. As FIG. 7 illustrates, when the solid-state drive 164 is idle (perhaps when all pending read requests 206 have been completed), the controller of the solid-state drive 164 may begin executing a queue of the write requests 208. The solid-state drive 164 may thus begin retrieving and executing the queued write requests 208 that were previously cached to the host memory buffer 200. The solid-state drive 164 thus flushes the pending write requests 208 in any order (such as chronological FIFO or LIFO). As each write request 208 is completed, the solid-state drive 164 may update any mapping table or information with logical and physical addresses. Should the solid-state drive 164 receive another or intervening read request 206, the solid state drive 164 may again suspend or defer the remaining cache of the write requests 208 stored in the host memory buffer 200.

Figure 8:
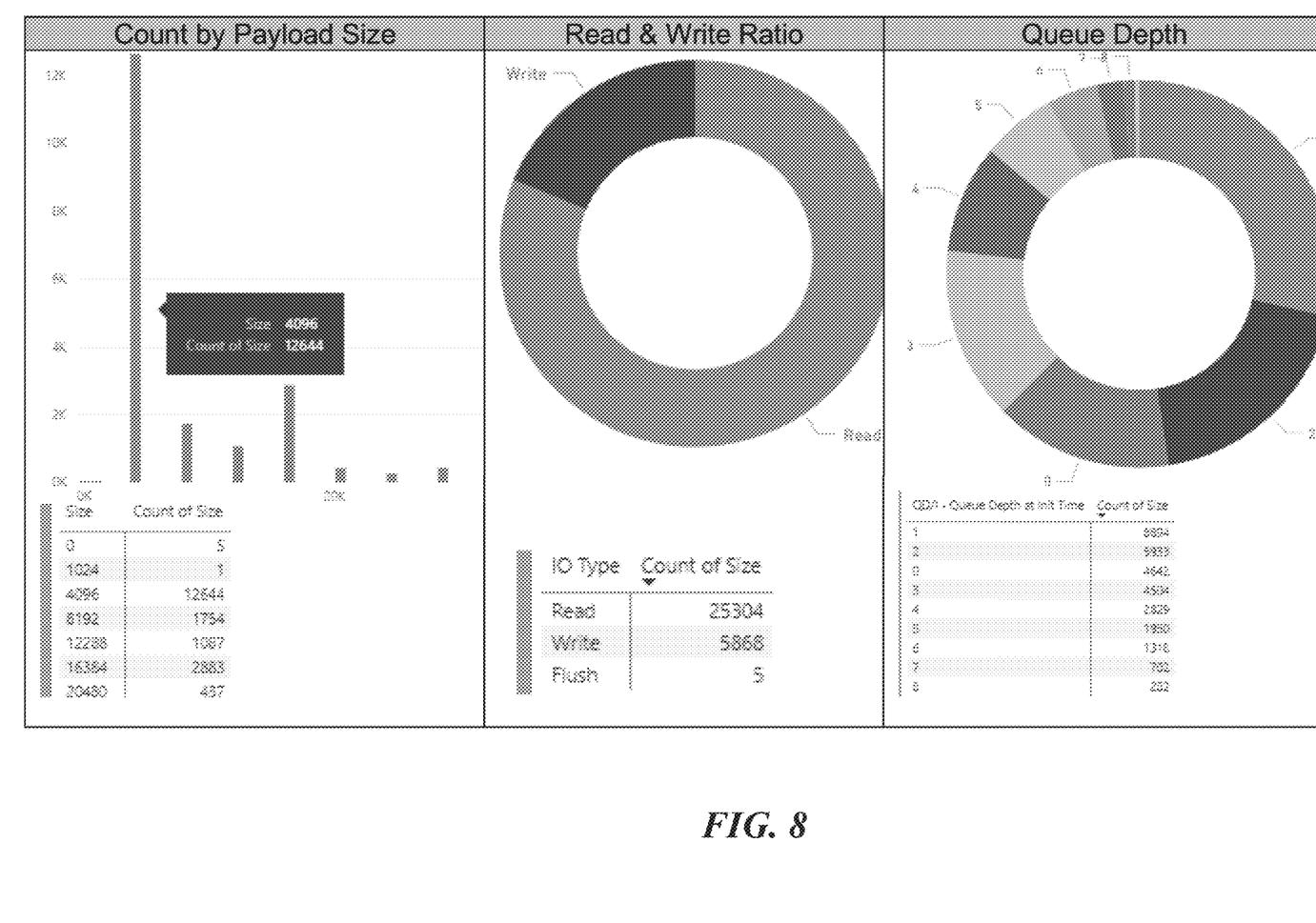
FIGS. 8-9 illustrate performance improvements, according to exemplary embodiments.
Figure 9:
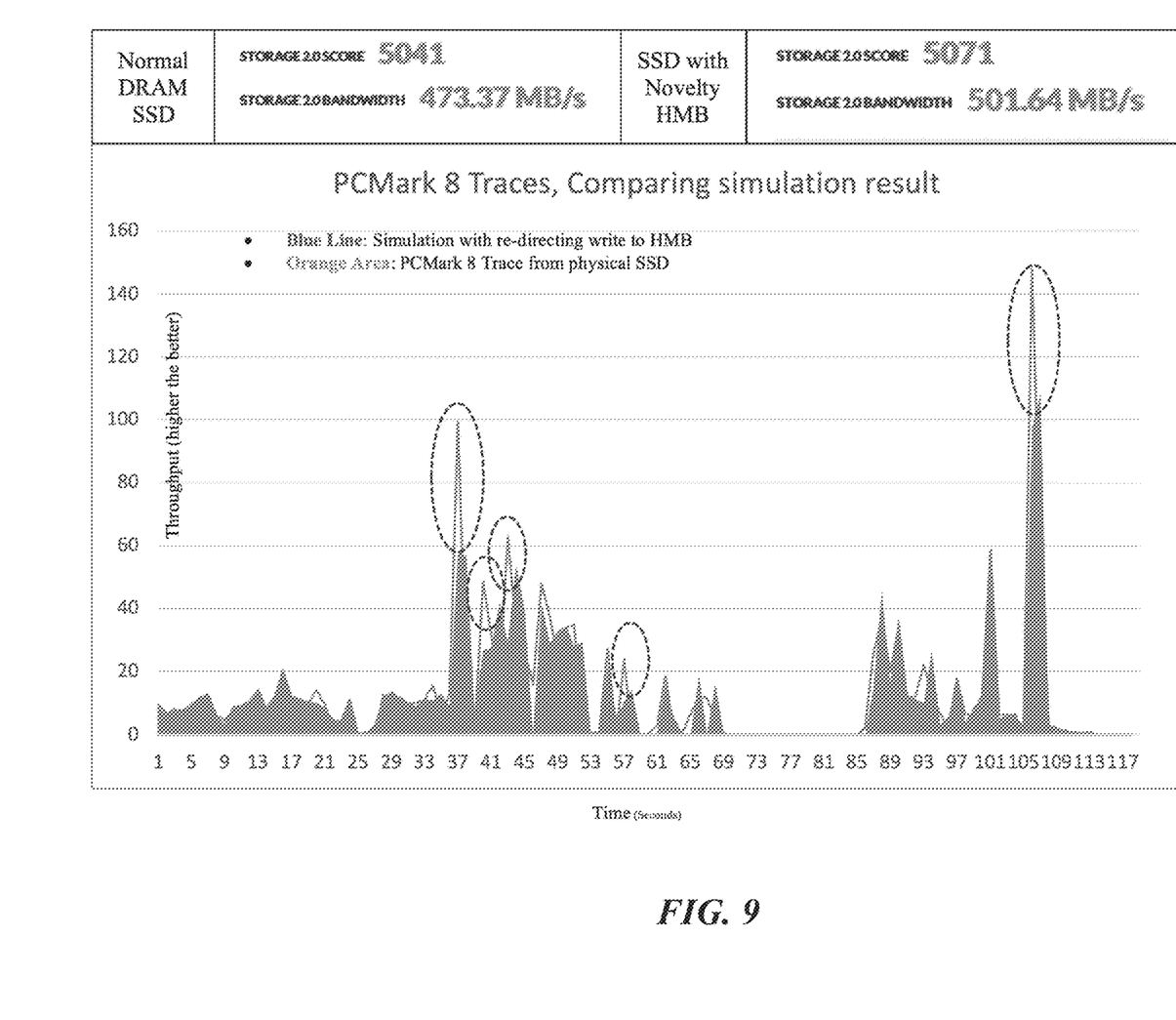

FIGS. 8-9 illustrate performance improvements, according to exemplary embodiments. Because the read operation 206 is prioritized, machine performance and the user's experience are enhanced. The host memory buffer 200 optimizes the input/output schedule in real life mixed IO scenarios. Any trace-based benchmark will result up to 30% better performance using the same SSD hardware. There is no additional cost since it is device firmware implementation. FIGS. 8-9 thus illustrate PC Mark 8 benchmarking (trace-based) analysis and simulation results. Real life workload consists of small payload sizes, with 4 KB is the highest used payload size. Access patterns are mixture of read and write (80% reads and 20% writes). Most of queue depths are low (less than 4), and 95% of the queue depths are less than eight (8). As FIG. 9 shows, the solid-state drive 164 with the host memory buffer 200 for write cache plus read prioritization boosts the performance of the same drive by 5%. The early simulated performance result is only able to prioritized 10% of potential read in the mixed workload. With further optimization, it can help to boost the performance up to 30%. This means that the write caching strategy differentiates system performance by 30% at the same hardware configuration.

Exemplary embodiments thus present an elegant solution. The solid-state drive 164 may suspend execution of any write request 208 and, instead, send or cache the write request 208 to the host memory buffer 200. The solid-state drive 164 may thus prioritize the read request 206 for relatively immediate response. Should no read requests 206 be pending, the solid-state drive 164 may then change its caching strategy and begin executing the queue of the write requests 208 stored in the host memory buffer 200. A thirty percent (30%) improvement in drive performance may result.

Figure 10:
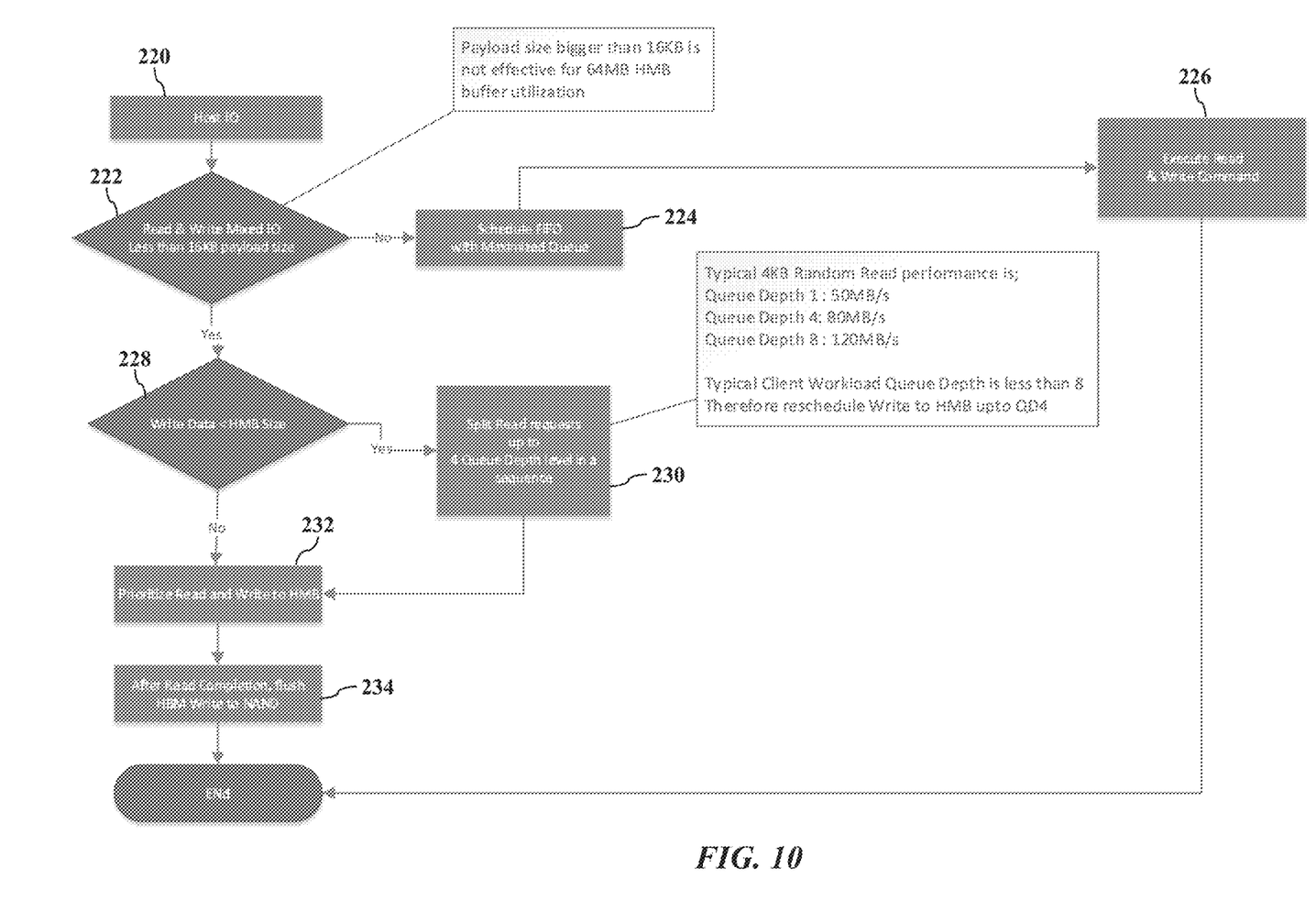
FIG. 10 illustrates a method or algorithm for caching to the host memory buffer, according to exemplary embodiments.

FIG. 10 illustrates a method or algorithm for caching to the host memory buffer 200, according to exemplary embodiments. The host information handling system 100 sends a sequence of input/output requests to the solid-state drive 164 (Block 220). The byte sizes of any of input/output requests (such as the read operation 206 and/or the write operation 208) are compared to a threshold size (such as 16 KB). If the payload sizes of the input/output requests fail to satisfy the threshold size (Block 222), then the input/output requests (such as read commands 206 and/or the write commands 208) are queued/scheduled (Block 224) and executed (Block 226). While the threshold size may be configurable to suit performance and memory objectives, large payloads (such as greater than the 16 KB) may be unsuited for smaller sizes of the host memory buffer 200 (such as 64 MB). However, should the payload sizes of the input/output requests satisfy the threshold size (Block 222), then the amount of the data to be written (as described or specified by the write request 208) is compared to the byte size of the host memory buffer 200. If the amount of the data to be written is less than size of the host memory buffer 200 (Block 228), then the read requests 206 may be split from the write requests 208 and sequentially queued (Block 230). The write requests 208 are written and queued to the host memory buffer 200 (Block 232). However, if the amount of the data to be written is greater than size of the host memory buffer 200 (Block 228), then the write requests 208 are written and queued to the host memory buffer 200 (Block 232). When the read requests 206 are completed, the queued write requests 208 (in the host memory buffer 200) are flushed and written to the NAND of the solid-state drive 164 (Block 234).

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
    configuring, an external host memory buffer operating in a host memory device of a host as a dedicated cache memory exclusively used by the solid-state drive;
    receiving a read request sent via an input/output channel from the host requesting the solid-state drive to read a first data;
    receiving a write request sent via the input/output channel from the host requesting the solid-state drive to write a second data to an internal cache memory operating in the solid-state drive;
    suspending an execution of the write request received via the input/output channel from the host;
    prioritizing the read request by caching the write request via the input/output channel to the external host memory buffer operating in the host memory device of the host as the dedicated cache memory exclusively used by the solid-state drive;
    reading the first data by executing the read request;
    in response to the executing of the read request, retrieving the write request cached to the external host memory buffer via the input/output channel from the host memory device of the host as the dedicated cache memory exclusively used by the solid-state drive; and
    executing the write request to write the second data to the internal cache memory operating in the solid-state drive.

2. The method of claim 1, further comprising retrieving a mapping information associated with the read request.

3. The method of claim 1, further comprising retrieving a mapping information associated with the write request.

4. The method of claim 1, further comprising executing an operating system.

5. The method of claim 1, further comprising queuing the write request.

6. The method of claim 1, further comprising sending the write request to the external host memory buffer.

7. An information handling system comprising:
    a hardware processor; and
    a memory device accessible to the hardware processor, the memory device storing instructions that when executed by the hardware processor perform operations, the operations including:
        configuring a portion of the memory device as an external dedicated cache memory exclusively used by a solid-state drive;
        sending a read request via an input/output channel to the solid-state drive requesting to read a first data from an internal cache memory operating in the solid-state drive;
        sending a write request via the input/output channel to the solid-state drive requesting to write a second data to the internal cache memory operating in the solid-state drive;
        receiving a cache request sent via the input/output channel from the solid-state drive requesting to cache the write request to the portion of the memory device configured as the external dedicated cache memory exclusively used by the solid-state drive;
        executing the read request to read the first data;
        in response to the executing of the read request, retrieving the write request cached to the portion of the memory device configured as the external dedicated cache memory exclusively used by the solid-state drive; and
        executing the write request to write the second data to the internal cache memory operating in the solid-state drive.

8. The system of claim 7, wherein the operations further include retrieving a mapping information associated with the read request.

9. The system of claim 7, wherein the operations further include retrieving a mapping information associated with the write request.

10. The system of claim 7, wherein the operations further include executing an operating system.

11. The system of claim 7, wherein the operations further include suspending the write request.

12. The system of claim 7, wherein the operations further include queuing the write request.

13. A memory device storing instructions that when executed by a processor perform operations, the operations including:
    configuring a portion of a host memory buffer operating in a host as an external dedicated cache memory exclusively used by a solid-state drive;
    receiving a read request sent via an input/output channel from the host requesting to read a first data from an internal cache memory operating in the solid-state drive;
    receiving a write request sent via the input/output channel from the host requesting to write a second data to the internal cache memory operating in the solid-state drive;
    suspending an execution of the write request received via the input/output channel from the host;
    prioritizing the read request by caching the write request via the input/output channel to the portion of the host memory buffer operating in the host as the external dedicated cache memory exclusively used by the solid-state drive;
    in response to executing the read request, retrieving the write request via the input/output channel from the portion of the host memory buffer operating in the host as the external dedicated cache memory exclusively used by the solid-state drive; and
    executing the write request.

14. The memory device of claim 13, wherein the operations further include retrieving a mapping information associated with the read request.

15. The memory device of claim 13, wherein the operations further include retrieving a mapping information associated with the write request.

16. The memory device of claim 15, wherein the operations further include executing an operating system.

17. The memory device of claim 13, wherein the operations further include queuing the write request.

\* \* \* \* \*